United States Patent [19]

Al Mouhamed

[11] Patent Number: 4,549,261
[45] Date of Patent: Oct. 22, 1985

[54] HYBRID ANALOG CONTROL STRUCTURE

[75] Inventor: Mayez Al Mouhamed, Talkalakh, Syria

[73] Assignee: Commissariat a l'Energie Atomique, Paris, France

[21] Appl. No.: 460,996

[22] Filed: Jan. 26, 1983

[30] Foreign Application Priority Data

Jan. 27, 1982 [FR] France ............................ 82 01235

[51] Int. Cl.$^4$ ............................................. G06F 15/46
[52] U.S. Cl. ...................................... 364/183; 364/157; 364/602; 318/600; 318/652
[58] Field of Search ............... 364/130, 157, 167, 174, 364/183, 400, 600-601, 602, 135; 318/560, 637, 651-652, 689

[56] References Cited

U.S. PATENT DOCUMENTS

| | | | |
|---|---|---|---|
| 3,250,903 | 5/1966 | Vasu et al. | 364/157 X |
| 3,422,965 | 1/1969 | Lloyd | 214/1 |
| 3,968,352 | 7/1976 | Andeen | 364/176 X |
| 4,052,598 | 10/1977 | Turner et al. | 364/157 X |
| 4,243,923 | 1/1981 | Whitney et al. | 364/167 X |
| 4,272,818 | 6/1981 | McDaniel | 364/167 X |
| 4,330,752 | 5/1982 | Rauskolb | 364/174 X |
| 4,387,421 | 6/1983 | Zach et al. | 364/130 X |
| 4,396,975 | 8/1983 | Kurakake | 364/174 X |
| 4,398,241 | 8/1983 | Baker et al. | 364/167 |

FOREIGN PATENT DOCUMENTS 2656433  6/1978  Fed. Rep. of Germany .

Primary Examiner—Jerry Smith
Assistant Examiner—Gary V. Harkcom

[57] ABSTRACT

A control system having the structure of a loop controls the shaft angular position of a motor driving a load in the situation wherein the inertia of the load, as referred back to the rotational axis of the motor, is variable. The system includes a computer providing values of gain, damping, and inertia which are used as multiplicative factors in processing a loop error signal. The error signal is the difference between a desired motor shaft position and the actual shaft position. Parallel multiplying branches, one of which includes a derivative circuit, are utilized for forming products of error signal and the derivative thereof by the gain and damping factors provided by the computer. The products are summed and provided as a drive signal to the motor. The drive signal may also include a second derivative of the desired shaft position, and may be scaled by the computed inertia.

4 Claims, 10 Drawing Figures

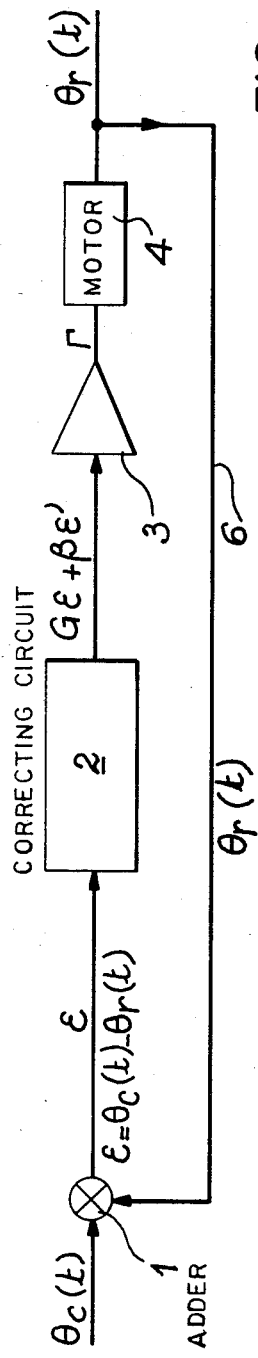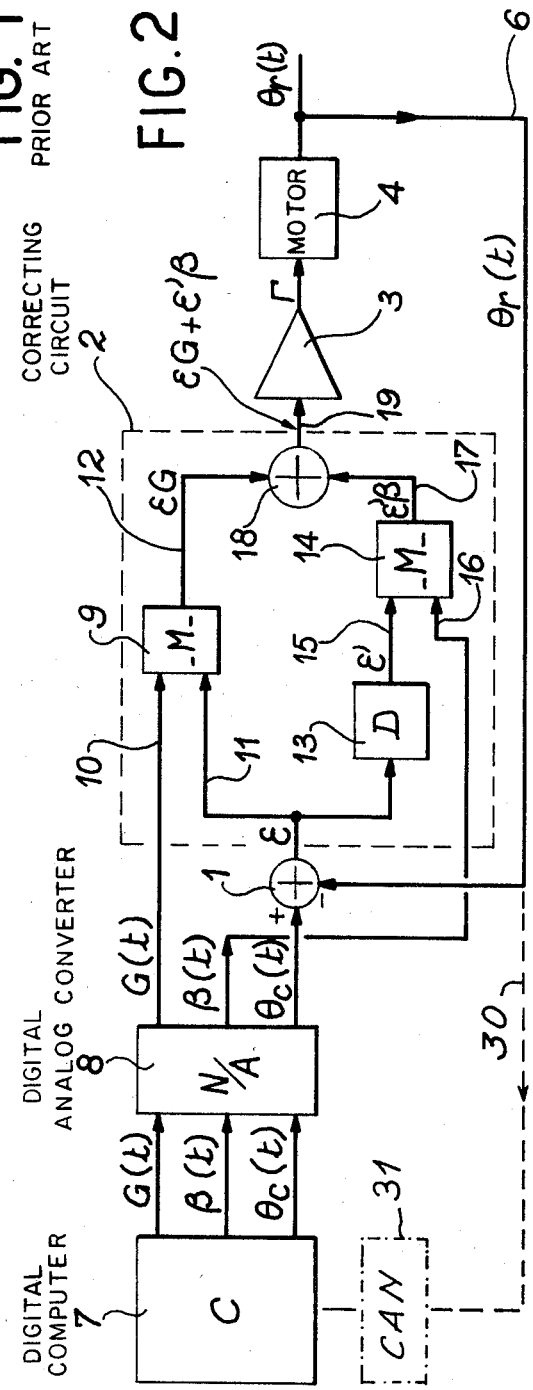

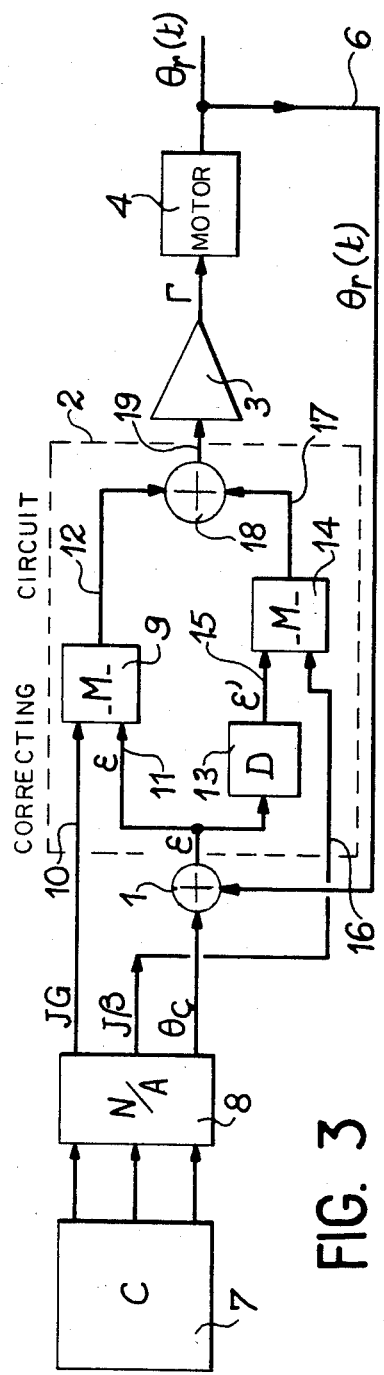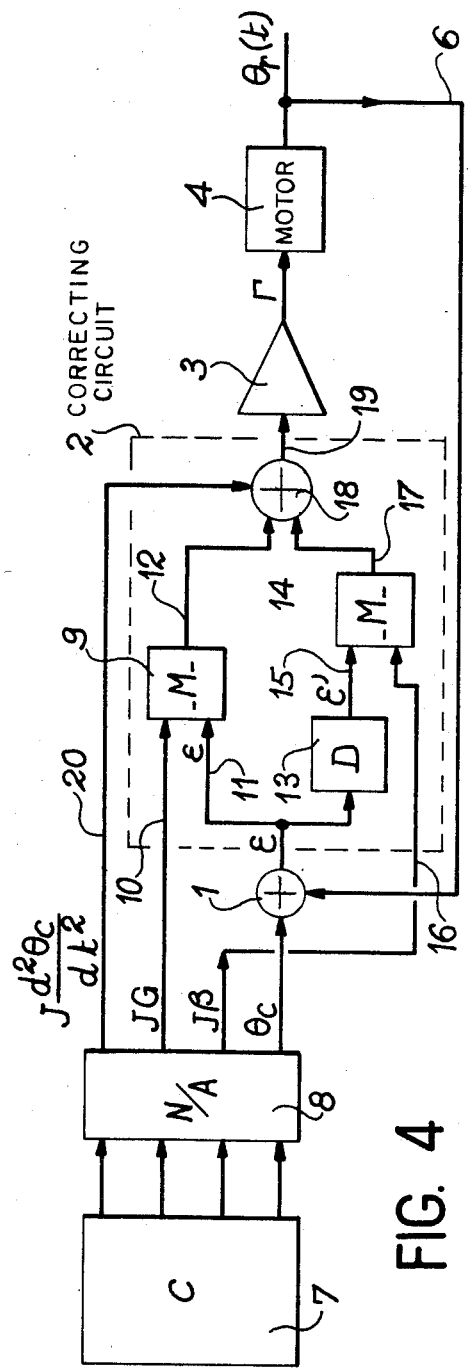

HYBRID ANALOG CONTROL STRUCTURE

BACKGROUND OF THE INVENTION

The present invention relates in general terms to the field of position controls of articulated systems, whose inertia varies as a function of the state of the system. This is the case with articulated manipulators, equipped with random rotary motive members (electrical, hydraulic or pneumatic) or certain machine tools. In equipment of this type, the inertia restored to the shaft of the control motor is obviously dependent on the geometrical state of the articulated system, as well as on the mass loads which the latter has to carry. The invention deals more specifically with the problem of making the real rotation angle $\theta_r(t)$ of the shaft of the control motor of the apparatus dependent on a reference value $\theta_c(t)$.

Such control systems have generally been hitherto realised with the aid of an analog structure emitting a control signal of the proportional and derived type, i.e. formed by two terms, whereof one is proportional to the error signal and the other to its derivative. Such a known control structure is shown in FIG. 1 illustrating how it is possible to constitute the error signal $\epsilon = \theta_c(t) - \theta_r(t)$ with the aid of an adder 1, which receives on the one hand the angular reference signal $\theta_c(t)$ and on the other the signal $\theta_r(t)$ corresponding to the real value of the rotation angle of a motor. This signal is introduced into a corrector 2 supplying at the output an analog signal of form $G\epsilon + \beta\epsilon'$ in which G and $\beta$ are the gain and damping of corrector 2 and chosen in an experimental manner, as will be explained hereinafter.

The analog signal $G\epsilon + \beta\epsilon'$ is then introduced into the power amplifier 3, which applies a torque $\Gamma$ to motor 4. An analog transducer takes the instantaneous value of $\theta_r(t)$ on the shaft of motor 4 and supplies it be feedback loop 6 to the negative input of adder 1.

The basic equation of the dynamics applied to the shaft of motor 4 makes it possible to write the following equation (1):

$$J(d^2\theta_r/dt^2) + \beta\epsilon' + G\epsilon = 0 \tag{1}$$

in which $\epsilon'$ is the derivative $d\epsilon/dt$ relative to the time of the error signal $\epsilon$. Theory and experience show that the performances, i.e. the behaviour modes of such a system (aperiodic, critical, damped oscillation) are dependent on the value respectively <0, zero or >0 of the discrimination $\Delta$ of the preceding equation, which is $\Delta = \beta^2 - 4JG$.

It is clear that a dependent control structure according to FIG. 1 causes virtually insoluble problems when the inertia restored to the shaft of motor 4 is itself variable as a function of the configuration of the articulated system because, in this case, the discriminant $\Delta$ also varies as a function of the same configuration and the performances of the control system are not constant. In other words, the variation of the inertia J due to the variations of the configuration of the articulated system and the loads taken up and transported leads to a mismatching of the gain G and damping $\beta$, whose values have been experimentally chosen for a given value $J_0$ of the inertia J restored to the shaft of motor 4. In operation, this leads to intolerable variations compared with the reference trajectories prescribed for the controlled apparatus. In addition, a regulation system such as that of FIG. 1 is far from easy to use in robotics due to the acceleration effects for which no correction is provided, because the control system of FIG. 1 is an approximation of the first order, which completely ignores acceleration effects. These deficiencies are particularly disturbing when the articulated system to be controlled is, for example, a robot having articulated arms with a plurality of motors actuating successive joints, whose position errors can consequently be dangerously summated.

In order to solve this problem and compensate the variations of the inertia by modifications to the gain and damping during operation, the invention proposes to realise a driving torque of form:

$$\Gamma_\mu = J(G\epsilon + \beta\epsilon') \tag{2}$$

which would lead to a closed loop equation of form:

$$(d^2\theta_r/dt^2) + \beta\epsilon' + G\epsilon = 0 \tag{3}$$

in which the inertial variable J has disappeared.

A control system of this type, which would make it possible to also correct acceleration effects by adding a term linked with the second derivative of the position reference signal could obviously be produced on a digital computer which, on the basis of the angular position of the axis of the motor plotted by a digital coder mounted on the motor shaft, would calculate the magnitude of the torque in accordance with the above equation (2) and would supply it to a digital—analog converter. The corresponding analog signal could then be used as the input for power amplifiers, which would transform it into a signal able to actuate the motor by accurately applying torque $\Gamma_\mu$ thereto. In practice, this therotetically possible solution is confronted by a large number of serious disadvantages, which make it virtually unusable for the following reasons:

1. All robotics equipment at present in use is designed to operate on an analog control basis and it would be necessary to completely replace existing cabling and potentiometers in order to adapt the equipment to digital operation. Moreover, it is well known that digital controls have an often disturbing sensitivity level with respect to external interference of different types.
2. In the case of an incident on the computer leading to its stoppage, there would be a "freeze" of the control instructions and the current supplied to the control of the motor shaft would be maintained at their value at the time of the incident, which could lead to catastrophic movements for the manipulators and the area around them, because the movements taking place at the time of the incident could, at least in theory, continue in an unlimited manner.
3. The construction of such control systems would make it necessary to use multiprocessing methods and would therefore be complex to realise.
4. The speed of existing digital computers is not generally adequate to ensure under satisfactory conditions the control of a robot having a certain number of joints in series (at least 25 ms would be necessary for the calculation of the inertia coefficients and the processing of the control $\Gamma_\mu$ in the case of a device having 6° of freedom, whereas correct operation would require all the instructions to be performed in less than 3 or 4 ms).
5. Digital coders are generally of a very large size and also sensitive to ionizing radiation, which can be very prejudicial when the remote manipulator or robot used is operating in an enclosure exposed to such radiation.

For all these reasons, a digital control system calculating at each instant, in accordance with the law defined in (2), the magnitude of the driving torque to be realised for accurately compensating the variations of the inertia acting on the gain and damping coefficients cannot be realised in practice.

BRIEF SUMMARY OF THE INVENTION

The present invention relates to an analog control structure for a loop for controlling the rotation position $\theta_r$ of a motor, whose inertial load J restored to (referred back to) the rotation axis is variable, which makes it possible to ensure in a simple manner and despite instantaneous variations of inertia J, a matching of the gain G and damping $\beta$ parameters of the control chain in such a way that the performance of the system, to within a tolerance percentage, remains close to the theoretical performance levels defined by the reference value $\theta_c$ of the rotation angle.

This structure, which is of the type which processes for the control of the torque ($\Gamma$) of a motor, an analog signal having at least two corrective terms of form $G\epsilon + \beta\epsilon'$, G and $\beta$ representing the gain and damping of the control loop for a value $J_0$ of the inertial load, $\epsilon$ the error signal for the angular position $\theta$ and $\epsilon'$ its derivative $d\epsilon/dt$ with respect to time, is characterized in that it comprises means for the instantaneous matching, during each variation of the restored inertia, of the values of the gain G and the damping $\beta$ in such a way that the real rotation $\theta_r$ of the controlled motor remains equal to the reference angle $\theta_c$ to within a defined percentage.

The presence of the instantaneous matching means consequently makes it possible to ensure that the sign of the discriminant $\Delta = \beta^2 - 4\,JG$ remains the same, i.e. there is no change to the oscillatory operating system for producing the reference instruction. In addition, the possible variations between the reference angle $\theta_c$ and the real angle $\theta_r$ of the rotation of the motor, due to the partial mismatching of the gain and damping coefficients, do not exceed a certain relative limit which has been fixed beforehand.

More specifically, according to the invention, said matching means comprise in combination:—a digital control unit keeping in its memory the values $\theta_c = f(t)$ of the reference rotation angle, receiving data on the revolution and loading of the motor and calculating, on the basis of an established programme and the preceding data, the successive values of the restored inertia J and, for each value thereof, the values G and $\beta$ for maintaining the matching of variables $\beta$, G and J to within a defined percentage;

a digital-analog converter converting the preceding quantities into analog signals;

a feedback loop making it possible to collect the real value $\theta_r$ of the rotation angle of the motor and establish, in a first adder, the instantaneous error signal $\epsilon = \theta_c(t) - \theta_r(t)$;

a correcting circuit for processing the analog signal representing the sum $G\epsilon + \beta\epsilon'$ and comprising two parallel branches receiving at the input the signal $\epsilon$, the first branch having a first analog multiplier with two inputs receiving the signals $\epsilon$ and G, the second branch having a differentiator producing the derived signal $\epsilon'$ and a second analog multiplier having two inputs receiving the signals $\epsilon'$ and $\beta$, the two parallel branches leading to a second adder;

the output of the second adder supplying the power amplifier and the actuator which applies the corresponding torque to the motor.

The use of a digital calculator makes it possible to carry out within the desired times and as a function of the configuration of the controlled articulated system, as well as the loads which it carries, the calculation of the inertia of system J restored to the axis of the motor, as well as that of the gain G and the damping $\epsilon$ in order to maintain the matching of the variables $\epsilon$, G and J, to within a defined percentage. The proportional and derived signals $G\epsilon$ and $\beta\epsilon'$ respectively are formed on the basis of analog multipliers having two inputs of a per se known type. According to the invention, only the computer constituting the control unit operates digitally, whilst a digital-analog converter ensures the connection with the remainder of the control chain, which operates in an analog manner and consequently permits it to be used on existing commercial equipment without any modification. The programme placed in the computer of the control unit makes it possible to ensure that the discriminant $\Delta$ of the system remains constant, to within a certain previously defined relative value.

According to a particularly interesting embodiment of the invention, the analog structure is designed to accurately correct the variations of the matching of the gain and damping coefficients G and $\beta$ respectively, as a function of variations of the restored inertia J caused by changes to the configuration of the controlled system and the masses which it moves, in order to obtain a closed loop equation of the control system of the form (3) defined hereinbefore. This analog structure is characterized in that the preceding controlled unit also calculates the products JG and J$\beta$ and injects them respectively, after passing through the digital-analog converter, into the gain input of the first multiplier and into the damping input of the second multiplier.

The multiplication performed in analog electronic multipliers of quantities J, G and $\beta$ makes it possible to make the closed loop equation (3) independent of the inertia coefficient J, which ensures a perfect matching of the gains and dampings for each configuration of the controlled articulated system.

According to an improved variant of the aforementioned embodiment, a further improvement is obtained to the nature of the control obtained by correcting the effects due to the angular acceleration of the control motor. To this end and according to the invention, the control unit also calculates the quantity $Jd^2\theta_c/dt^2$ which is introduced, after analog coding in the digital-analog converter, into the second adder located at the output of the correcting circuit.

Thus, the possibility provided by the digital computer of calculating, in a sufficiently short time, the second derivative of the rotation angle of the motor relative to time, makes it possible to take account of the angular acceleration effects, which was not possible with the prior art regulation using two proportional and derived terms. This leads to a significant improvement to the reliability of the system, when the angular accelerations of the control motors of the control system reach values which cannot be ignored, which is frequently the case.

The control unit of the analog control structure according to the invention can be a random digital computer, although the use of a microprocessor is recommended.

BRIEF DESCRIPTION OF THE DRAWINGS

The invention is described in greater detail hereinafter relative to three non-limitative embodiments and the attached drawings, wherein show:

FIG. 1 the known diagram of a conventional control system of the proportional/derived type.

FIG. 2 a structure for a control loop according to the invention in which, to within a certain percentage, there has been a partial correction of the mismatchings of the system as a function of the variations of the inertia J.

FIG. 3 a realisation diagram for a structure for a control loop according to the invention in which there is an accurate correction of the mismatching errors of the gain and damping of the control system, as a function of variations in the restored inertia J of the system.

FIG. 4 a structure for a control loop according to the invention, which reproduces the elements of FIG. 3, whilst adding a correction of the angular accelerations.

DETAILED DESCRIPTION OF THE PREFERRED EMBODIMENTS

Figure 5A:
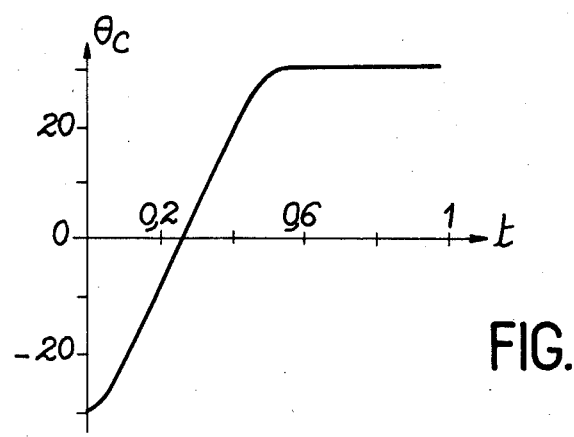
FIG. 5 (5a, 5b, 5c) the evolution in time of an angular reference $\theta_c$ (FIG. 5a) by the control system of FIG. 1 (FIG. 5b) and by the system of FIG. 4 (FIG. 5c), whereby in FIGS. 5a, 5b and 5c, the angles are expressed in ordinates and in degrees and the times in abscissas and in seconds.

FIG. 1 is the diagram of a known analog control loop of the proportional—derived type showing the adder 1, which receives the angular reference signal $\theta_c(t)$ at its positive input and, by the control loop 6, the signal $\theta_r(t)$ represents the real rotation of the motor 4 to control at its negative input. Thus, adder 1 processes the error signal $\epsilon(t) = \theta_c(t) - \theta_r(t)$, which is converted by correcting circuit 2 into a two-term signal $G\epsilon + \beta\epsilon'$, G and $\beta$ being constant values of the gain and damping of the control loop and $\epsilon'$ the derivative $d\epsilon/dt$ of the error signal relative to time. This two-term signal is introduced into power amplifier 3 applying the desired torque to motor 4. Such a control system has modest performance levels and which also vary when the inertia of the system controlled by motor 4 varies, because this leads to a mismatching of the gain G and damping $\beta$ coefficients respectively, in this case fixed at a constant value once and for all.

In the first embodiment of the analog structure for a control loop according to the invention shown in FIG. 2, as in FIG. 1, there is a motor 4 supplied by power amplifier 3. As in FIG. 1, feedback loop 6 makes it possible to restore to the negative input of adder 1 the instantaneous value $\theta_r(t)$ of the angular position of the shaft of motor 4. In this first variant according to the invention, a control unit essentially constituted by a digital computer 7, which stores the angular reference position $\theta_c(t)$ calculates at each instant the exact value of the inertia J restored to the axis of the motor as a function of the spatial configuration of the articulated robot which it controls, as well as the masses which it has to displace. On the basis of this value of the restored inertia J, it also calculates for each configuration of the controlled robot values G and $\beta$ of the gain and damping in such a way as to maintain the matching of these three variables to within a defined percentage. According to the invention, a digital-analog converter 8 converts the aforementioned quantities into analog form and the latter are used in the following way for supplying corrector 2, which serves to process the control signal supplied to the input of power amplifier 3.

For this purpose, a first adder 1 firstly receives at its positive terminal the angular reference signal $\theta_c(t)$ and at its negative terminal, via loop 6, the analog value of the real position angle $\theta_r(t)$ of motor 4. Adder 1 processes the error signal $\epsilon$, which enters corrector 2 formed by two parallel branches. The branch shown in the upper part of the drawing, or first branch, has a first two-input analog multiplier 9, whereof the first input 10 receives signal G and the second input 11 receives signal $\epsilon$. Thus, this analog multiplier 9 supplies at the ouput on line 12, the analog signal $\epsilon G$. The corrector 2 also comprises a second branch, which is parallel to the first branch, and has a differentiator 13 and a second analog multiplier 14 with two inputs. Differentiator 13 constructs the function $\epsilon' = d\epsilon/dt$, which is injected into the first input 15 of multiplier 14. The second input 16 of multiplier 14 receives the analog quantity $\beta$ directly from the digital-analog converter 8. Thus, on the output line 17 of multiplier 14 appears analog signal $\epsilon'\beta$. The two lines 12 and 17 lead to a second adder 18, supplying at the output on line 19 supplying power amplifier 13, the overall analog correction signal $\epsilon G = \epsilon'\beta$ in which G and $\beta$ vary as a function of the configuration of the controlled articulated system and the masses which it carries, i.e. ultimately as a function of time.

The structure of FIG. 2 is of the hybrid type, i.e. it uses for the rapid calculations a digital control unit 7, whereas the complete control chain behind the digital-analog converter 8 and up to the control system for the axis of motor 4 is of the analog type. Thus, a hybrid structure is involved, whereof the actual control part is of an analog type and makes it possible to use at motor 4 equipment (sensors, potentiometers, etc) which are conventionally used in equipment of this type and which are commercially available.

Finally, the fact that the control signal $\epsilon G + \epsilon'\beta$ injected by line 19 into power amplifier 3 is adapted to variations of G and $\beta$ (contrary to what occurs in the prior art according to FIG. 1) makes it possible to control the values assumed by the discriminant $\Delta = \beta^2 - 4JG$ of the aforementioned closed loop equation and, to within a defined percentage which can be chosen as close as desired to the perfect control, permits a very precise control of the real position angle $\theta_r(t)$ as a function of the reference angle $\theta_c(t)$.

In the variant of FIG. 2, instead of starting from angular reference position $\theta_c$ for calculating the restored inertia J, the digital computer 7 receives the established value $\theta_r$ of the angular position of the shaft of motor 4 by line 30 across an analog-digital converter 31 positioned thereon.

The same elements as in FIG. 2 appear in FIG. 3 with the same references. However, in this case, a particularly accurate matching of variations of gain G and damping $\beta$ is sought in order to completely compensate the variations of the inertia restored to the axis of motor J for each position of the controlled articulated robot and each value of the manipulated loads. For this purpose, a system is used, whose closed loop equation is given by the aforementioned equation (3), i.e. it is independent of the inertial variable J. This is why control unit 7, which performs the same calculations as in the case of FIG. 2, also processes the instantaneous products JG and Jβ which, after conversion into analog signals in converter 8, respectively supply the input 10 of the first multiplier 9 and the input 16 of the second multiplier 14.

Thus, the diagram of FIG. 3 represents a structure according to the invention, which completely corrects the matching errors of gains G and dampings β in operation, for all the successive values of the inertia J restored to the axis of motor 4. Thus, with the aid of this structure, a very much superior control is obtained as compared with the prior art, as will be made apparent hereinafter by certain figures obtained on real systems.

However, a final improvement can be made to the structure of FIG. 3, which relates to the corrections of angular accelerations which cannot be taken into account by the latter structure. For this purpose, a third variant of the analog control structure according to the invention is shown in FIG. 4 in which the same elements as in FIGS. 2 and 3 carry the same references and to them is added a line 20, which introduces the analog quantities $J\, d^2\theta_c/dt^2$ calculated by computer 7 and introduced into the second adder 18.

To illustrate the performance levels obtained with the aid of the means of FIGS. 3 and 4, curves for recording the evolution of the real control angle $\theta_r$ as a function of the reference angle $\theta_c$ will now be given.

Figure 5B:
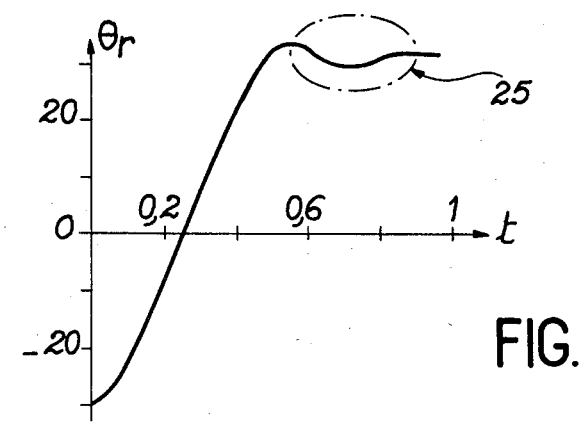
Figure 5C:
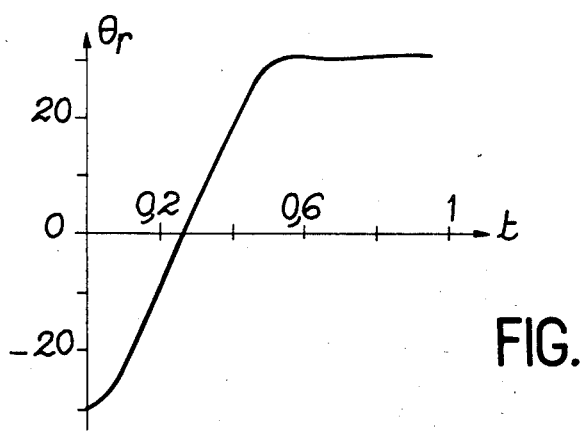

FIGS. 5a, 5b and 5c relate to a rotation control of a motor on the basis of a reference angle $\theta_c$, whose desired evolution in time is represented in FIG. 5a, the time being expressed in seconds and the angle in degrees. If control takes place by using a known proportional—derived system of the type described in FIG. 1, the curve of FIG. 5b is obtained for the real angle $\theta_r$, which shows significant temporary problems in zone 25.

If the arrangement of FIG. 4 is used for effecting the same control, then we obtain the recording curve of FIG. 5c where, the temporary disturbances of zone 25 are greatly reduced.

Figure 6A:
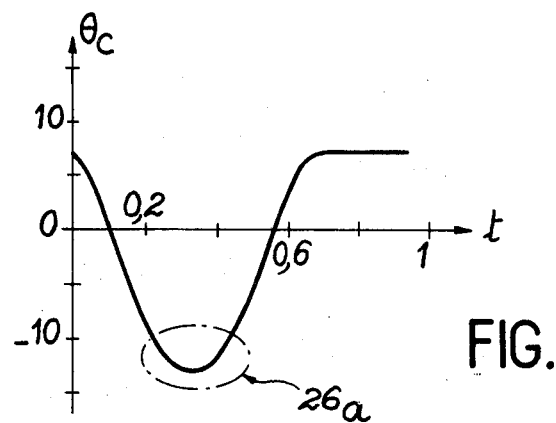
FIG. 6 (6a, 6b, 6c) the evolution in time of an angular reference $\theta_c$ (FIG. 6a) by the control system of FIG. 1 (FIG. 6b) and by the system of FIG. 4 (FIG. 6c), whereby in FIGS. 6a, 6b and 6c the angles are expressed in ordinates and in degrees and the times in abscissas and in seconds.
Figure 6B:
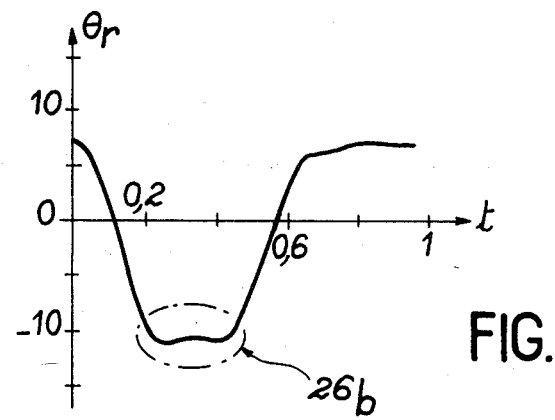
Figure 6C:
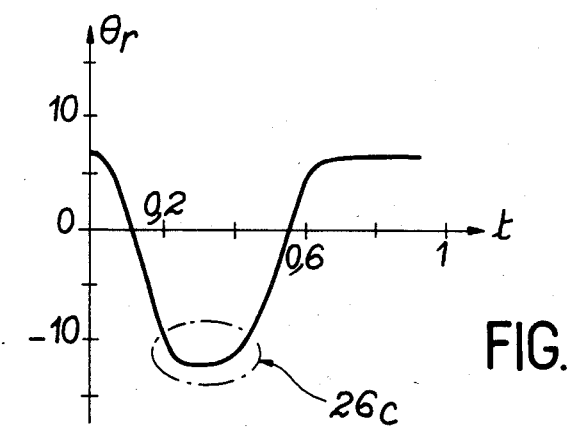

FIGS. 6a, 6b and 6c illustrate the interest of the supplementary correction of the angular acceleration with the aid of a structure like that of FIG. 4. FIG. 6a shows the variation of reference $\theta_c$ desired for a controlled motor. FIG. 6b shows the evolution of the real rotation angle $\theta_r$ with the aid of a proportional—derived system like that of FIG. 1. FIG. 6b shows the control obtained and the variation of the real angle $\theta_r$ on correcting both the matchings of the gain and the damping, as well as the acceleration effects. The way in which the reference curve variation zone 26a is reproduced at 26b and 26c in FIGS. 6b and 6c illustrates the technical advance obtained as a result of the control structures according to the invention.

The scope of the invention obviously also covers manual constructions in which a digital computer calculates at each instant the inertia J and in which the operator by means of control knobs modifies the values of gain G and the damping β.

Furthermore, the configurations described in FIGS. 2, 3 and 4 are the best which can be realised in the present state of the art. However, according to the invention, it is also possible to use a digital computer for producing the control signal of motor 4. The analog solution described is preferred because it is not subject to the vibrations of the motor, which often accompany a digital construction.

What is claimed is:

1. A control system having a loop for control of the shaft angular position $\theta_r$ of a motor driving a load, wherein the load inertia J referred to the rotational axis of the motor is variable, said system energizing said motor to produce a torque in response to an error ε equal to the difference between a commanded angular position $\theta_c$ and the real angular position $\theta_r$ of said motor shaft, said system comprising:

a computer providing values of a loop gain G and a loop damping β;

a transducer sensing the motor shaft position $\theta_r$;

first adder means for combining the commanded position $\theta_c$ and the real position $\theta_r$ to form the error ε;

a first and a second multiplying means coupled between said computer and said first adder means for forming the products, respectively, Gε and βε', said second multiplying means including derivative means for differentiating ε to provide its derivative ε'; and second adder means for summing the Gε and the βε' products of said first and said second multiplying means, said second adder means being coupled between said first multiplying means and said second multiplying means and said motor for ouputting a signal proportional to Gε and βε' to impart a desired value of torque to said motor for driving the load.

2. A system according to claim 1 wherein said computer provides a value of the inertia J, said computer multiplying G and β by J and outputting the respective products JG and Jβ respectively to said first and said second multiplying means, and wherein output signals of said first multiplying means and said second multiplying means and said second adder means are scaled by the inertia J to provide a more accurate value of motor torque for reduction of the error β.

3. A system according to claim 2 wherein said commanded angular position $\theta_c$ is applied to said computer, said computer forming the second derivative of $\theta_c''$ with respect to time and multiplying said second derivative by the inertia J, said computer outputting the product of $J\theta_c''$ to said second adder means, said second adder means summing said $J\theta_c''$ into its output signal to provide further accuracy in the value of motor torque for further reduction of the error β.

4. A system according to claim 3 wherein said computer is a digital computer, said system further comprising means for converting digital signals of said computer to analog signals to enable said second adder means to energize said motor with analog signals.

* * * * *